United States Patent
Reeve et al.

(10) Patent No.: US 7,601,203 B2
(45) Date of Patent: Oct. 13, 2009

(54) HYBRID VACUUM SYSTEM FOR FUEL DEOXYGENATION

(75) Inventors: Hayden M. Reeve, West Hartford, CT (US); Thomas G. Tillman, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 579 days.

(21) Appl. No.: 11/482,284

(22) Filed: Jul. 7, 2006

(65) Prior Publication Data

US 2008/0006156 A1    Jan. 10, 2008

(51) Int. Cl.
*B01D 53/22* (2006.01)

(52) U.S. Cl. .......................... 96/6; 96/9; 96/10; 95/46; 95/54; 210/640; 210/641

(58) Field of Classification Search ............... 96/4, 96/6, 9, 10; 95/45, 46, 54; 210/640, 641
See application file for complete search history.

(56) References Cited

U.S. PATENT DOCUMENTS

| | | | | |
|---|---|---|---|---|
| 5,073,268 A | * | 12/1991 | Saito et al. ........................ | 96/6 |
| 5,340,384 A | * | 8/1994 | Sims ................................ | 96/6 |
| 5,584,914 A | * | 12/1996 | Senoo et al. ..................... | 96/6 |
| 6,248,157 B1 | * | 6/2001 | Sims et al. ....................... | 96/6 |
| 6,709,492 B1 | * | 3/2004 | Spadaccini et al. .............. | 96/6 |
| 6,837,992 B2 | * | 1/2005 | Gerner et al. .................... | 96/6 |
| 6,986,802 B2 | * | 1/2006 | Colling et al. .................. | 95/46 |
| 7,427,312 B2 | * | 9/2008 | Gerner et al. .................. | 95/46 |
| 7,435,283 B2 | * | 10/2008 | Tillman et al. .................. | 95/46 |
| 7,497,895 B2 | * | 3/2009 | Sabottke ........................ | 95/45 |

\* cited by examiner

*Primary Examiner*—Jason M Greene
(74) *Attorney, Agent, or Firm*—Carlson, Gaskey & Olds

(57) ABSTRACT

A fuel system for a gas turbine engine removes oxygen from fuel with a fuel stabilization unit (FSU). The FSU includes a first vacuum stage, where vacuum pressure is created by an ejector and a second vacuum stage where vacuum pressure is created by the ejector and a vacuum pump. The vacuum stream from the first vacuum stage and the second vacuum stage flow through the ejector. The vacuum stream from the second vacuum stage is all that passes through the vacuum pump.

12 Claims, 2 Drawing Sheets

HYBRID VACUUM SYSTEM FOR FUEL DEOXYGENATION

BACKGROUND OF THE INVENTION

This invention relates to a vacuum system for a fuel stabilization unit (FSU) for a gas turbine engine. More particularly, this invention relates to a system for generating a vacuum utilized in removing dissolved oxygen from a fuel stream.

A fuel stabilization unit (FSU) reduces the amount of oxygen dissolved within fuel for a gas turbine engine to increase the maximum allowable temperature of the fuel. One method of removing dissolved oxygen from fuels is by using a semi-permeable membrane de-oxygenator. In a membrane de-oxygenator, fuel is pumped over an oxygen permeable membrane. As the fuel passes over the membrane, a partial oxygen pressure differential across the membrane promotes the transport of oxygen out of the fuel through the membrane.

A vacuum is one means of generating the required partial oxygen pressure differential. Typically, multi-stage vacuums are created using vacuum pumps. Each vacuum pump is sized based on the volume of waste flow that passes through the vacuum pump. The volume of waste flow is dependant on the amount of de-oxygenation required for the system. As the size of vacuum pumps increase so does the cost and overall weight. As can be appreciated, space aboard an aircraft is limited and any increase in device size affects overall configuration and operation.

An apparatus and method for creating a vacuum in a fuel stabilization unit providing decreased cost and weight is needed.

SUMMARY OF THE INVENTION

An example fuel stabilization unit (FSU) includes multiple chambers with different vacuum pressures for removing oxygen from a fuel stream and separate vacuum outlets from each of the chambers.

An example FSU for removing dissolved oxygen from fuel includes a first vacuum stage where oxygen is removed from the fuel through an oxygen permeable membrane as a result of vacuum pressure. The vacuum pressure within the first vacuum stage is created by an ejector. The discharge including the dissolved oxygen exits the first vacuum stage and flows through a first vacuum line to the ejector.

The fuel flows to a second vacuum stage where additional oxygen is removed from the fuel as a result of a vacuum pressure lower than that in the first vacuum stage. The ejector and a vacuum pump create vacuum pressure within the second vacuum stage. The vacuum stream from the second vacuum stage exits the FSU through a second vacuum line and flows through the vacuum pump then through the ejector.

The ejector creates a first vacuum for the first vacuum stage and the second vacuum stage. The vacuum pump assists the ejector for the second vacuum stage only, to create a second vacuum. The discharge from the second vacuum stage is all that passes through the vacuum pump reducing the volume flow through the vacuum pump.

These and other features of the present invention can be best understood from the following specification and drawings, the following of which is a brief description.

DETAILED DESCRIPTION OF THE PREFERRED EMBODIMENT

Figure 1:
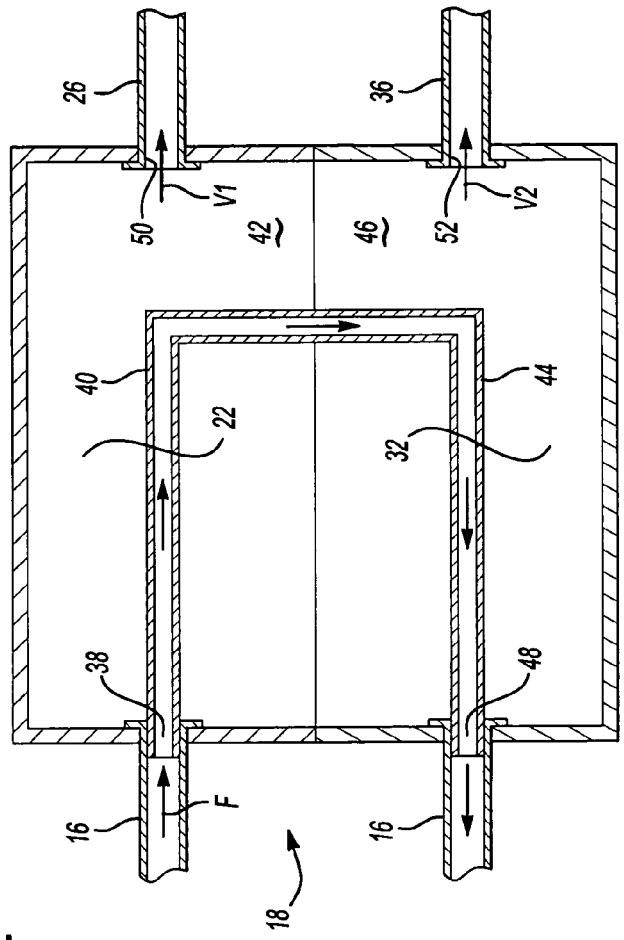
FIG. 1 shows an example fuel delivery system for a gas turbine engine.

A fuel delivery system 10 is shown schematically in FIG. 1. The system 10 is preferably for use in delivering fuel to a gas turbine engine 12. Fuel from a fuel supply 14 flows through a fuel path 16 to a fuel stabilization unit (FSU) 18 for de-oxygentating the fuel. The fuel continues to flow through the fuel path 16 exiting the FSU 18 and is discharged from fuel nozzles 20 into the engine 12.

The FSU 18 removes oxygen and other constituents (such as nitrogen and light hydrocarbons) from the fuel. Within the FSU 18 the fuel flow path 16 passes a first vacuum stage 22. A vacuum pressure within the first vacuum stage 22 is preferably created by an ejector 24. A vacuum stream from the first vacuum stage 22 includes the discharge from the fuel as a result of the deoxygenating process. The vacuum stream exits the FSU 18 and flows through a first vacuum line 26 to the ejector 24 that is creating the vacuum. The vacuum stream from the ejector 24 then flows into a sink 28 or other disposal device. The ejector 24 includes a high pressure air source 30 that generates the vacuum within the first vacuum line 26 thereby creating the vacuum at the first vacuum stage 22.

Ejectors 24 are simple and efficient mechanisms for creating vacuum pressure. The ejector 24 creates a vacuum by means of the Venturi effect within the first vacuum line 26 with the higher pressure air supply 30. However, ejectors cannot achieve the vacuum pressures required to de-oxygenate the fuel to the desired level. Thus, a second vacuum stage 32 is required.

Referring to the example of FIG. 1, the fuel within the fuel path 16 continues through the FSU 18 to the second vacuum stage 32. The ejector 24 and a vacuum pump 34 create the vacuum pressure within the second vacuum stage 32. Additional oxygen and other constituents (typically nitrogen and light hydrocarbons) are removed from the fuel. The fuel then exits the FSU 18 and continues through the fuel path 16 to the fuel nozzles 20 and to the engine 12. The vacuum stream from the second vacuum stage 32 exits the FSU 18 through a second vacuum line 36. The vacuum stream in the second vacuum line 36 flows through the vacuum pump 34 used to create the second vacuum stage 32. The vacuum stream from the second vacuum stage 32 then flows through the ejector 24 and joins with the vacuum stream from the first vacuum stage 22.

The ejector 24 creates a first vacuum pressure for the first vacuum stage 22 and the second vacuum stage 32. The vacuum pump 34 assists the ejector for the second vacuum stage 32 only, to create a second vacuum, which is a lower pressure than that of the first vacuum, i.e. the pressure in the second vacuum line 36 is lower than the pressure in the first vacuum line 26. The vacuum stream from the second vacuum stage 32 is all that passes through the vacuum pump 34. Due to the reduced volume flow through the vacuum pump 34 a lower pump capacity is sufficient than one required to handle the volume flow of the entire vacuum stream.

If either the ejector 24 or the vacuum pump 34 is not working the fuel system 10 will still operate to remove oxygen from the fuel through the operating ejector 24 or vacuum pump 34. Although the overall efficiency of the system in de-oxygenating the fuel will be diminished is oxygen levels will still be reduced an appreciable amount. This, is not the desired operating mode of the system, but can be used as a back up mode.

Figure 2:
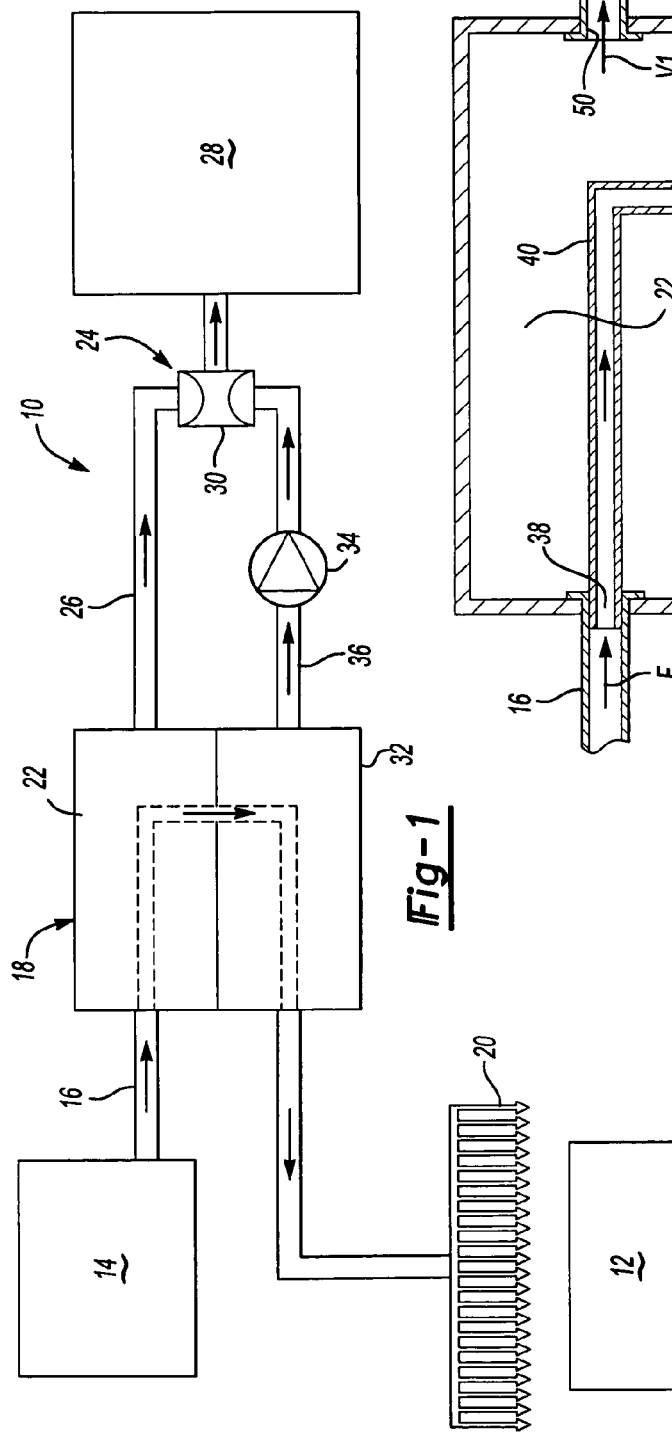
FIG. 2 is a schematic illustration of an example fuel stabilization unit.

FIG. 2 schematically illustrates the example FSU 18. Fuel, indicated by arrow F, flows within the fuel path 16 through a fuel inlet 38 into the first vacuum stage 22. Dissolved oxygen and other contaminants are removed through an oxygen permeable membrane 40 into a first vacuum chamber 42 as a result of vacuum pressure created within the first vacuum chamber 42. The vacuum creates a partial oxygen pressure differential across the oxygen permeable membrane 40. Dissolved oxygen, within the fuel in the fuel path 16, migrates through the oxygen permeable membrane 40 as a result of the partial pressure differential. The oxygen permeable membrane 40 permits oxygen, nitrogen and some light hydrocarbons, to permeate through the oxygen permeable membrane 40 into the vacuum chamber 42. The heavier fuel molecules cannot pass through the oxygen permeable membrane 40 and continue to flow within the fuel path 16. The fuel within the fuel path 16 flows out of the first vacuum stage 22 to a second vacuum stage 32. More of the dissolved oxygen is removed through an oxygen permeable membrane 44 into a second vacuum chamber 46 as a result of vacuum pressure created within the second vacuum chamber 46. The fuel within the fuel path 16 flows out of the second vacuum stage 32 and the FSU 18 through a fuel outlet 48 and continues through the system toward the engine 12.

The vacuum stream, indicated with arrow V1 within the first vacuum chamber 42 flows out through the first vacuum outlet 50 into the first vacuum line 26 toward the ejector 24 (shown in FIG. 1). The vacuum stream within the second vacuum chamber 46 flows out through the second vacuum outlet 52 into the second vacuum line 36 toward the vacuum pump 34 (shown in FIG. 1) and then on to the ejector 24. The vacuum stream V2 leaving the second vacuum chamber 46 has a separate path from the vacuum stream from the first vacuum chamber 42. Only the vacuum stream from the second vacuum chamber 46 passes through the vacuum pump 34.

Figure 3:
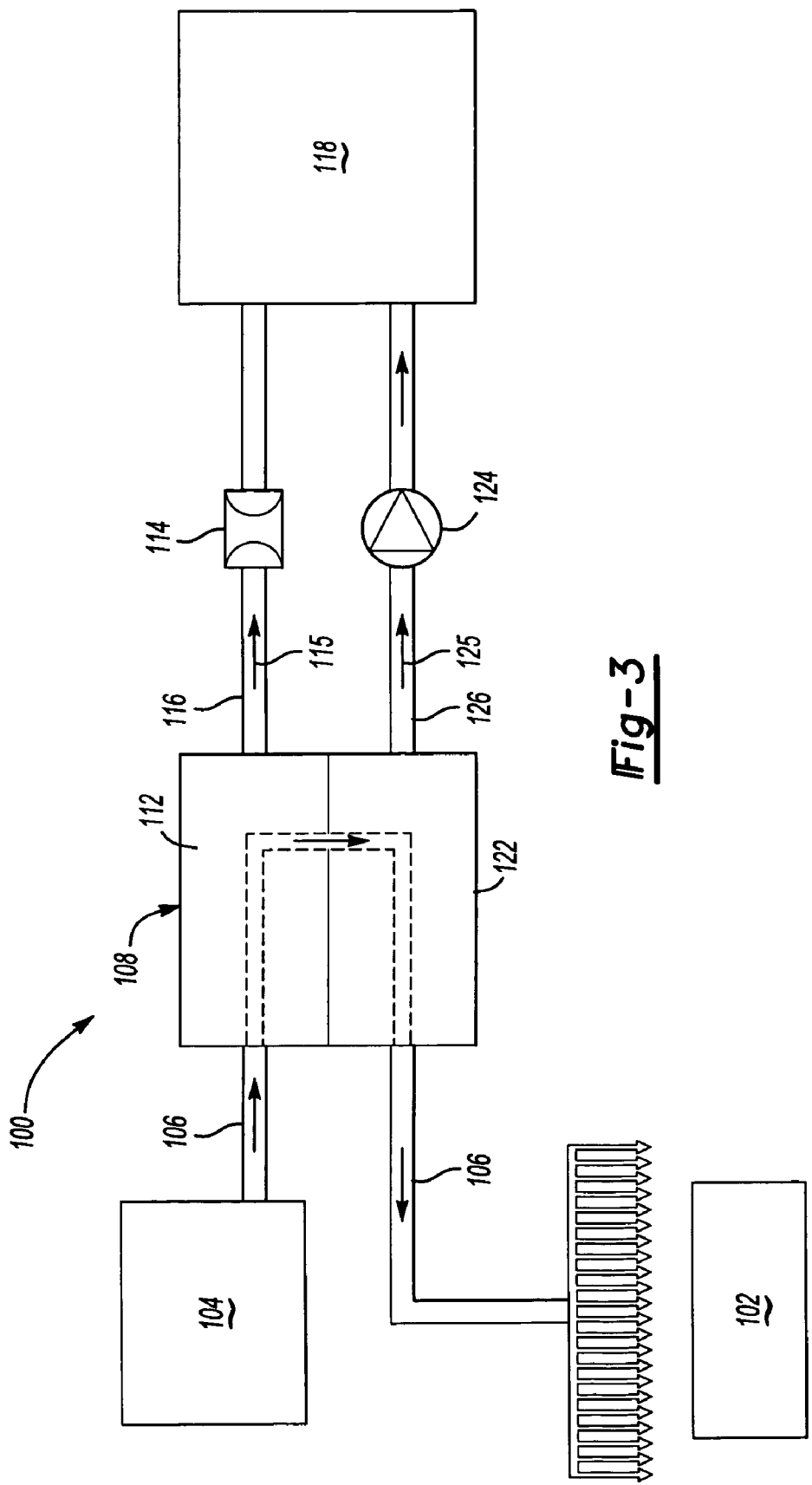
FIG. 3 is another example fuel delivery system for a gas turbine engine.

FIG. 3 is a schematic view illustrating another example fuel delivery system 100. The system 100 is preferably for use in delivering fuel to a gas turbine engine 102. Fuel from a fuel supply 104 flows through a fuel path 106 to a fuel stabilization unit (FSU) 108 for de-oxygenating the fuel. The fuel continues to flow through the fuel path 106 exiting the FSU 108 and is discharged from fuel nozzles 110 into the engine 102.

Within the FSU 108 the fuel flow path 106 passes a first vacuum stage 112. A vacuum pressure within the first vacuum stage 112 is preferably created by an ejector 114. The vacuum stream 115 from the first vacuum stage 112 exits the FSU 108 and flows through a first vacuum line 116 to the ejector 114 that is creating the vacuum. The first vacuum stream 115 from the ejector 114 then flows into a sink 118 or other disposal device where oxygen is stored or vented overboard.

The fuel within the fuel path 106 continues through the FSU 108 to the second vacuum stage 122. A vacuum pump 124 creates the vacuum pressure within the second vacuum stage 122. Additional oxygen and contaminants are removed from the fuel. The fuel then exits the FSU 108 and continues through the fuel path 106 to the fuel nozzles 110 and to the engine 102. The second vacuum stream 125 from the second vacuum stage 122 exits the FSU 108 through a second vacuum line 126. The second vacuum stream 125 in the second vacuum line 126 flows through the vacuum pump 124 to the sink 118.

The ejector 114 creates a first vacuum pressure for the first vacuum stage 112 and the vacuum pump 124 creates a second vacuum pressure for the second vacuum stage 122. Only the second vacuum stream 125 from the second vacuum stage 122 flows through the vacuum pump 124. Thus, the vacuum pump 124 has a capacity for the volume flow from the second vacuum stage 122 only.

Although the disclosed examples discuss an ejector to create a first vacuum and a vacuum pump to create a second vacuum other components may be utilized to create the vacuums. As is clear from the several embodiments, the "component" which forms the first vacuum is different than the "component" which forms the second vacuum.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A fuel stabilization unit comprising:
   a first vacuum stage for generating a first oxygen partial pressure differential across an oxygen permeable membrane;
   a second vacuum stage for generating a second oxygen partial pressure differential across the oxygen permeable membrane;
   said first vacuum stage comprising a first component, and said second vacuum stage comprising a second component, with said first and second components being different types of vacuum-creating components;
   a fuel passage defined through the first vacuum stage and the second vacuum stage;
   a first vacuum outlet connected to the first vacuum stage to remove oxygen from the first vacuum stage;
   a second vacuum outlet connected to the second vacuum stage to remove oxygen from the second vacuum stage, wherein the first vacuum outlet and the second vacuum outlet are separate;
   the second oxygen partial pressure differential is greater than the first oxygen partial pressure differential;
   the first vacuum stage and the second vacuum stage are separated from each other within the fuel stabilization unit; and
   said oxygen permeable membrane permits permeation of oxygen and nitrogen, but does not permit permeation of heavier fuel molecules.

2. The fuel stabilization unit of claim 1, wherein the first vacuum stage comprises an ejector for generating a desired vacuum pressure for producing the first oxygen partial pressure differential.

3. The fuel stabilization unit of claim 2, wherein the second vacuum stage comprises a vacuum pump for generating a desired vacuum pressure for producing the second oxygen partial pressure differential.

4. The fuel stabilization unit of claim 2, wherein the second vacuum stage comprises the ejector and a vacuum pump for generating a desired vacuum pressure for producing the second oxygen partial pressure differential.

5. A fuel deoxygenation system for a gas turbine engine comprising:
   a first component for generating a first vacuum pressure at a first vacuum stage;
   a first vacuum outlet connected to the first vacuum stage;
   a second component for generating a second vacuum pressure at a second vacuum stage;
   said first vacuum stage comprising a first component, and said second vacuum stage comprising a second component, with said first and second components being different types of vacuum-creating components;

a second vacuum outlet connected to the second vacuum stage, wherein the second vacuum outlet is separate from the first vacuum outlet;

a fuel passage defined through the first vacuum stage and the second vacuum stage;

the first vacuum stage and the second vacuum stage are separated from each other within a fuel stabilization unit; and the fuel passage passing through an oxygen permeable membrane, said oxygen permeable membrane permits permeation of oxygen and nitrogen, but does not permit permeation of heavier fuel molecules.

6. The fuel system of claim 5, wherein the first component comprises an ejector.

7. The fuel system of claim 6, wherein the second component comprises a vacuum pump.

8. The fuel system of claim 7, wherein first vacuum outlet is connected to the ejector and the second vacuum outlet is connected to the vacuum pump.

9. The fuel system of claim 6, wherein the second component comprises the ejector and a vacuum pump.

10. The fuel system of claim 9, wherein the first vacuum outlet is connected to the ejector and the second vacuum outlet is connected to the ejector and the vacuum pump.

11. The fuel stabilization unit of claim 1, wherein an inlet to the fuel passage being connected to a fuel supply, and an outlet of the fuel passage, downstream of the second vacuum stage, being connected to a fuel injector.

12. The fuel system of claim 5, wherein an inlet to the fuel passage being connected to a fuel supply, and an outlet of the fuel passage, downstream of the second vacuum stage, being connected to a fuel injector.

* * * * *

UNITED STATES PATENT AND TRADEMARK OFFICE
CERTIFICATE OF CORRECTION

PATENT NO. : 7,601,203 B2
APPLICATION NO. : 11/482284
DATED : October 13, 2009
INVENTOR(S) : Reeve et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 677 days.

Signed and Sealed this

Fifth Day of October, 2010

David J. Kappos
*Director of the United States Patent and Trademark Office*